United States Patent [19]
Nishimura

[11] 4,011,411
[45] Mar. 8, 1977

[54] AUTOMATIC TELEPHONE ANSWERING AND RECORDING DEVICE

[75] Inventor: Yuichi Nishimura, Mitaka, Japan

[73] Assignee: Iwatsu Electric Co., Ltd., Tokyo, Japan

[22] Filed: June 13, 1975

[21] Appl. No.: 586,584

Related U.S. Application Data

[63] Continuation-in-part of Ser. No. 431,223, Jan. 7, 1974, abandoned.

[30] Foreign Application Priority Data

Jan. 12, 1973 Japan .................................. 48-5888

[52] U.S. Cl. .................................. 179/6 E; 179/6 C
[51] Int. Cl.$^2$ .......................................... H04M 1/64
[58] Field of Search ... 179/6 E, 6 C, 2 A, 100.1 DR

[56] References Cited

UNITED STATES PATENTS

| | | | |
|---|---|---|---|
| 3,106,612 | 10/1963 | Lowelson | 179/6 E |
| 3,286,033 | 11/1966 | Lowelson | 179/6 E |
| 3,310,629 | 3/1967 | Yamamoto | 179/6 E |

*Primary Examiner*—Raymond F. Cardillo, Jr.
*Attorney, Agent, or Firm*—Oblon, Fisher, Spivak, McClelland & Maier

[57] ABSTRACT

In an automatic telephone answering and recording device associated with a telephone set connected to a remote calling party through a telephone line wherein the message transmitted from the calling party is recorded, there is provided a sound recording tape provided with a plurality of sound tracks, sound recording and reproducing heads cooperating with the tape, a receiving circuit for receiving a message transmitted from the calling party, head switching means for selecting a head associated with the first sound track, control means responsive to the message received by the receiving circuit for recording the message in the first sound track by the selected head, remote control means responsive to a reproduction request signal transmitted from the calling party for causing the control means to reproduce the message in the first sound track by the selected head, and a line control circuit for transmitting the message reproduced from the first sound track to the remote calling party. The remote control means also responds to a new call signal for causing the head switching means to select another head associated with the second sound track to record a subsequent message in the second sound track.

10 Claims, 4 Drawing Figures

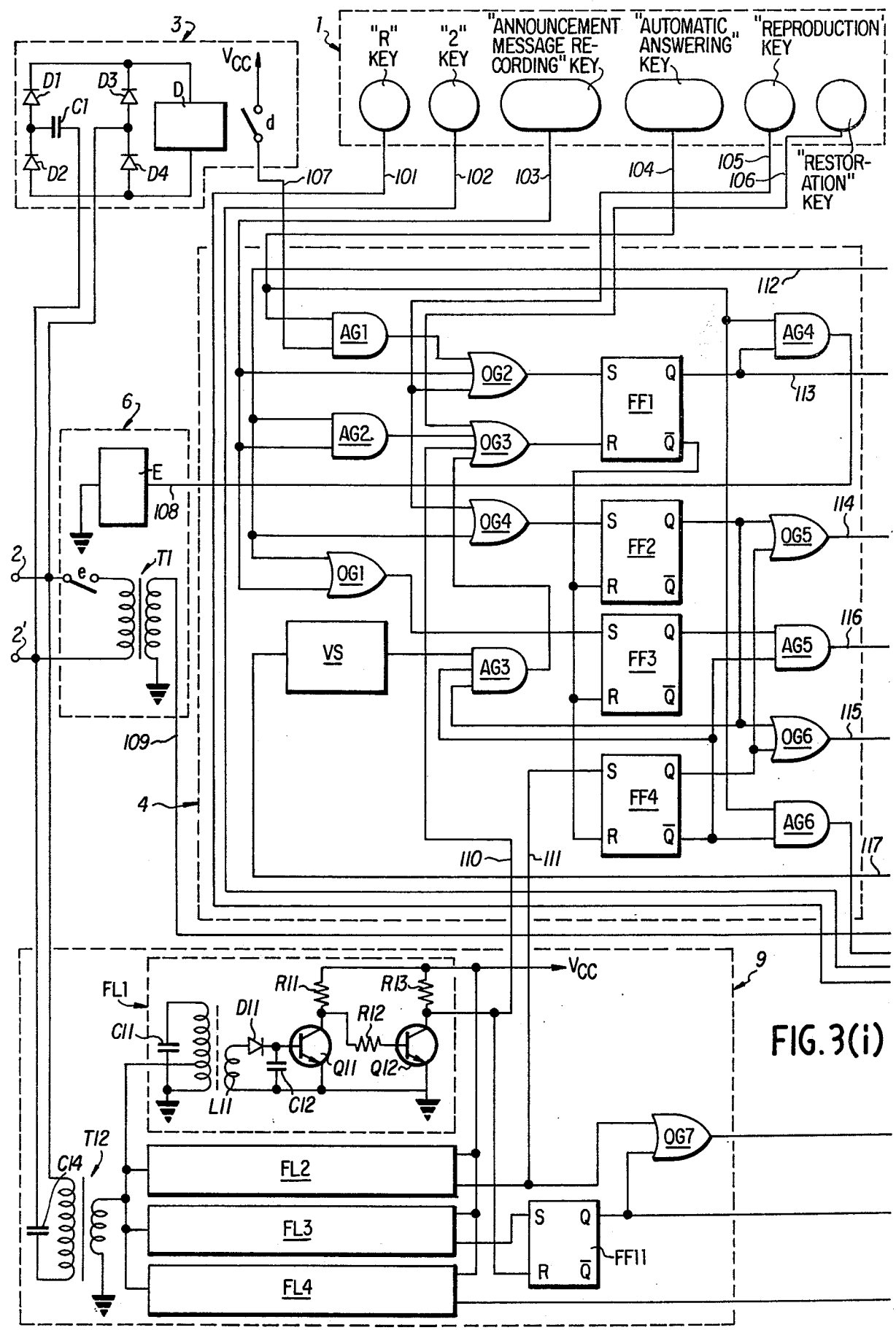

AUTOMATIC TELEPHONE ANSWERING AND RECORDING DEVICE

CROSS REFERENCE TO RELATED APPLICATION

This application is a continuation-in-part of patent application Ser. No. 431,223 filed Jan. 7, 1974 entitled AUTOMATIC TELEPHONE ANSWERING AND RECORDING DEVICE, now abandoned.

BACKGROUND OF THE INVENTION

1. Field of the Invention:

This invention relates to an automatic telephone answering and recording device adapted to be connected to a telephone line wherein a prescribed message is sent to a calling party in response to a call signal and the message from the calling party is recorded by a sound recorder, and more particularly, to protection of the recorded message.

2. Description of the Prior Art:

A modern automatic telephone answering and recording device is required to have a remote control feature, that is, an ability of remotely controlling the device by sending a signal thereto over the telephone line. In prior art message recording apparatus, however, due considerations have not been made for the protection of a message which was recorded prior to such remote control as well as for the improvement of the operating efficiency of the apparatus.

More particularly, in the prior art apparatus, when a remote calling party has operated the apparatus and has heard the message by reproducing it from a recording tape (message tape) and if it is desired to preserve the message or to reuse the message tape in response to a subsequent call signal, it has been necessary to set the apparatus in a condition to await the next call signal by the manipulation of the operator or to entirely take up the portion of the message tape on which the message has been recorded by the automatic operation of the apparatus. This is necessary in order that a previously recorded message would not be erased by the recording operation of a subsequent new message.

Take up operation of the recording tape involves two problems. One relates to an inadvertent erasure of the message due to inaccurate take up operation. In other words, since there is a substantial blank space between one message and a subsequent message, it is extremely difficult to determine which one of the messages was recorded last. For this reason, the last recorded message is often identified erroneously. Upon inadvertent identification, a previous message would be erased by the recording of a subsequent message. There is no serious problem if a message once reproduced and heard were erased inadvertently. However, for certain reasons, operators often neglect to reproduce and listen to the recorded message. In such a case, the inadvertently erased portion of the tape may contain a not yet listened to message thus resulting in a serious problem. The other problem relates to the time required for the tape take up operation. Since a long magnetic tape such as a compact cassette tape is generally used as the message tape, the interval in which the message is recorded often amounts to one hour, and since the tape take up operation should be performed while searching for the presence or absence of the recorded message by reproducing the message tape, such operation requires a long period. Such a long period necessary for the take up operation alone not only wastes the time available for the operator but also decreases the efficiency of the operation of the apparatus because a new call signal cannot be received during the take up operation.

SUMMARY OF THE INVENTION

It is an object of this invention to provide an improved automatic telephone answering and recording device capable of providing accurate protection of the recorded message and improving the operating efficiency of the device.

The foregoing and other objects are attained in accordance with one aspect of the present invention through the provision of an automatic telephone answering and recording device adapted to be associated with a telephone set which is connected to a remote calling party through a telephone line, wherein the message transmitted from the calling party is recorded on a recording tape, characterized in that the device comprises a sound recording tape provided with a plurality of sound tracks, sound recording and reproducing heads cooperating with the sound recording tape, a receiving circuit for receiving a message transmitted from the calling party, head switching means for selecting a sound recording and reproducing head associated with the first sound track of the recording tape, control means responsive to the message received by the receiving circuit for recording the message in the first sound track by the selected sound recording and reproducing head, remote control means responsive to a reproduction request signal transmitted from the calling party for causing the control means to reproduce the message in the first sound track by the selected sound recording and reproducing head, and a line control circuit for transmitting the message reproduced from the first sound track to the remote calling party, said remote control means responding to a new call signal for causing the head switching means to select another sound recording and reproducing head associated with the second sound track to record a subsequent message in the second sound track.

When the calling party determines that the message reproduced from the first sound track is not worthwhile to preserve, the calling party transmits a special control signal and the remote control means responds to the special control signal to reselect the sound recording and reproducing head associated with the first sound track to record a subsequent message in the first sound track.

Further, the device is provided with an announcement tape, the receiving circuit responds to a call signal transmitted from the calling party for driving the announcement tape and the announcement signal reproduced from the announcement tape is transmitted to the calling party through the control means and the line control circuit. When transmission of the reproduced announcement signal is completed, the control means starts to drive the message tape to prepare for the recording of a message transmitted from the remote control party.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings, in which.

DETAILED DESCRIPTION OF A PREFERRED EMBODIMENT

Figure 1:
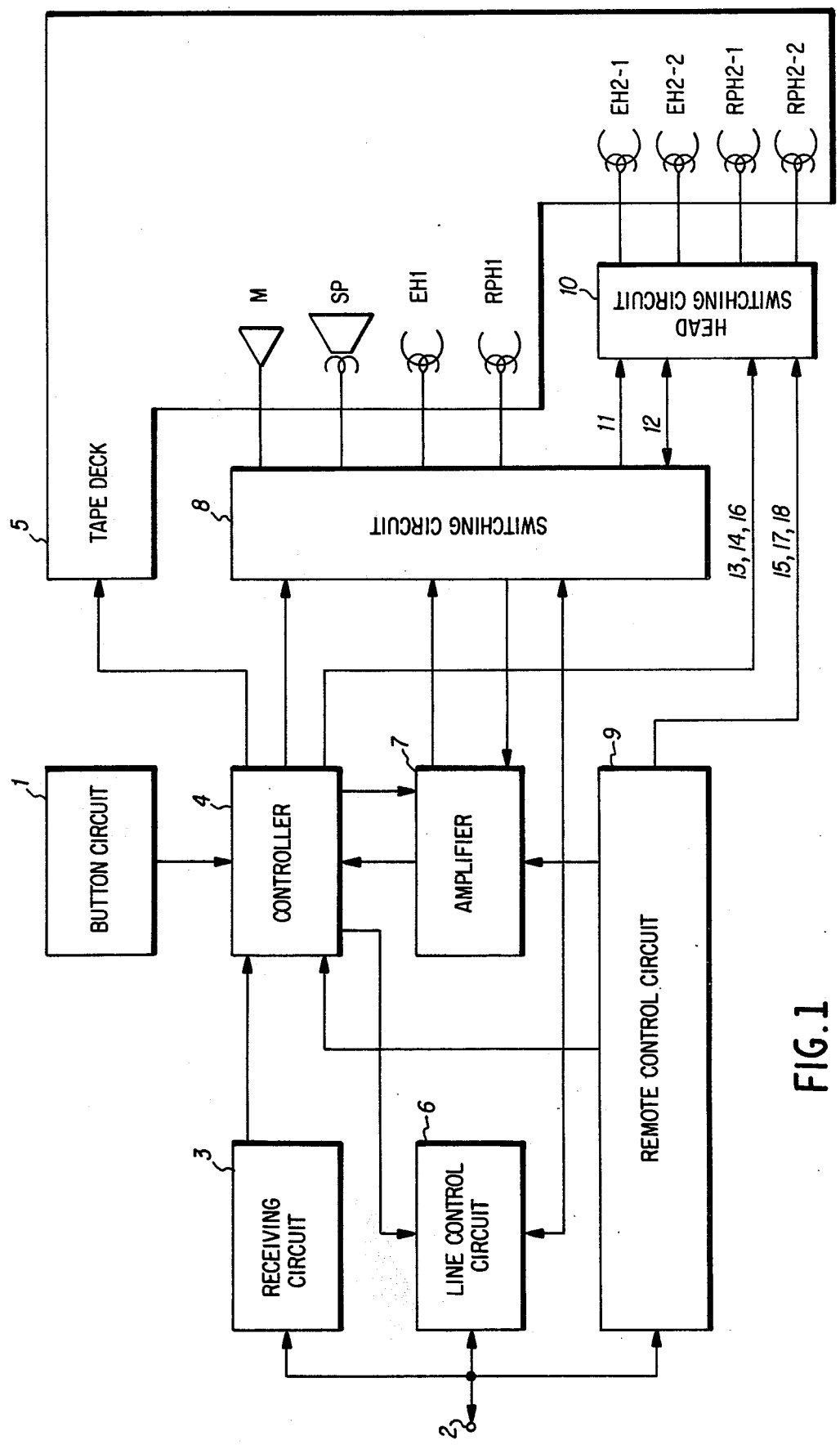
FIG. 1 is a block diagram showing one embodiment of the invention.

Referring now to the drawings, wherein like reference numerals designate identical or corresponding parts throughout the several views, and more particularly to FIG. 1 thereof, a preferred embodiment of the automatic telephone answering and recording device shown in FIG. 1 includes a button circuit 1 provided with a push button (not shown) which determines the function of the device, a line terminal 2 connected to a telephone line, not shown, a receiving circuit 3 connected to the line terminal 2 for detecting a call signal, a controller 4 for controlling the operation of the device, a tape deck 5 containing two magnetic tapes for recording an announcement and a message and connected to the controller 4, a line control circuit 6 connected to the line terminal 2 for transmitting a DC closing loop signal and message signals to the telephone line under the control of the controller 4, an amplifier 7, a remote control circuit 9 for performing a remote control operation of the device and a switching circuit 8 connected to be controlled by the controller 4 and the remote control circuit 9 for selectively controlling input and output terminal devices illustrated as a microphone M, a loudspeaker SP, a recording and reproducing head RPH1 and an erasing head EH1 for the magnetic tape for recording an announce and message, a recording and reproducing head RPH2 and an erasing head EH2 for the message tape. According to the invention, since the message tape is provided with two tracks (not shown), the recording and reproducing head RPH2 and the erasing head EH2 respectively comprise two sets of recording and reproducing heads RPH2-1 and RPH2-2 and erasing heads EH2-1 and EH2-2. For this reason, there is also provided a head switching circuit 10 for using either one of these two sets. The device thus far described is associated with a telephone set (not shown) connected to the telephone line.

Figure 2:
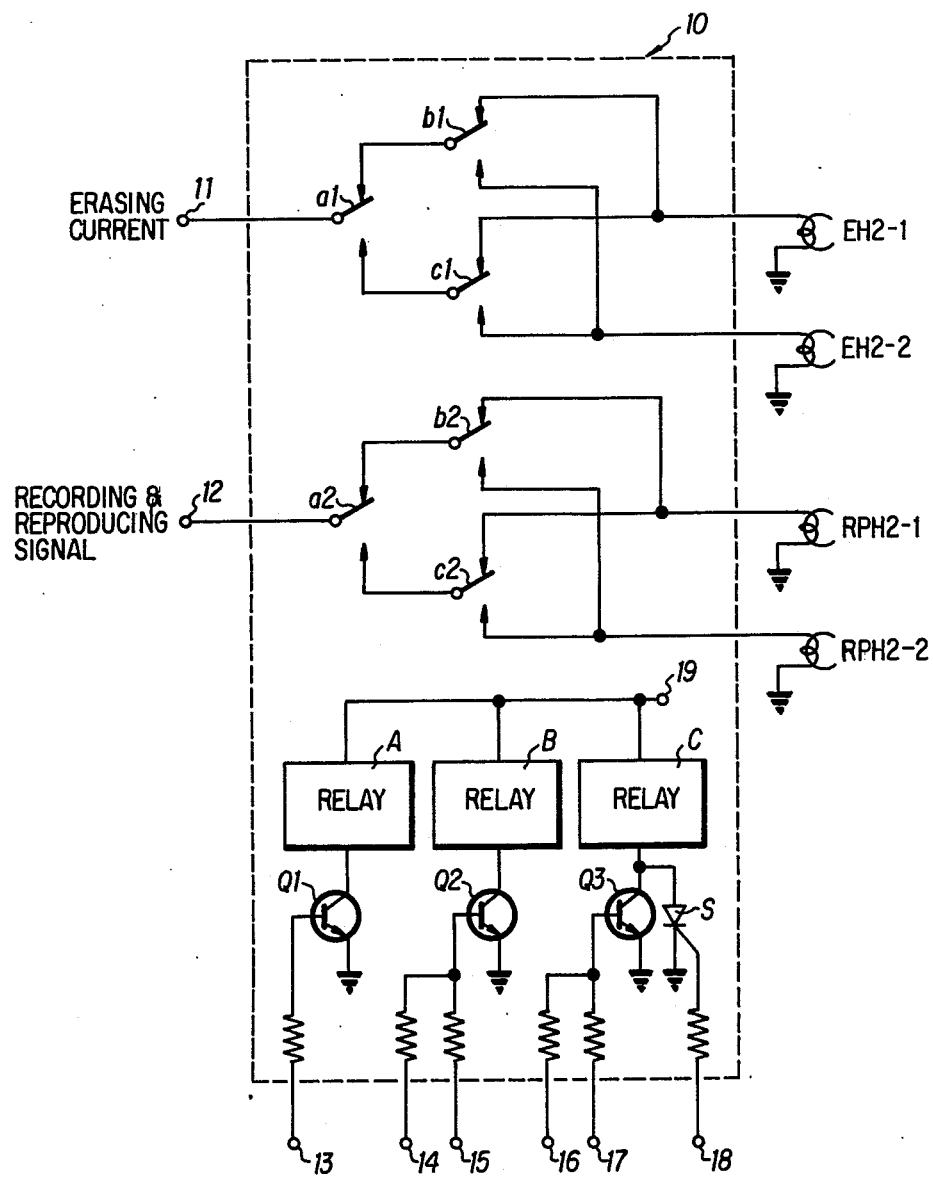
FIG. 2 is a connection diagram showing the detail of the head switching circuit shown in FIG. 1, and FIGS. 3(i) and 3(ii) together comprise a circuit diagram of the components of FIG. 1.

FIG. 2 is a connection diagram showing the detail of the head switching circuit 10 comprising an input terminal 11 for the erasing current, an input-output terminal 12 for the recording and reproducing signals, relays A, B and C having contacts $a_1$, $a_2$, $b_1$, $b_2$, $c_1$ and $c_2$ respectively, transistors $Q_1$, $Q_2$ and $Q_3$ connected to relays A, B and C, respectively, control signal input terminals 13 through 18, corresponding to reference numerals 13 through 18 shown in FIG. 1 and a thyristor S connected to the collector electrode of transistor $Q_3$ and a source terminal 19.

The operation of the head switching circuit 10 shown in FIG. 2 will now be described. When the device is in the calling signal waiting condition (except the remote control operation), controller 4 applies a control signal to input terminal 13 so as to turn ON transistor $Q_1$ to operate relay A. Relay B can be energized, when the operator desires, by turning ON transistor $Q_2$. Relay C is energized by thyristor S which is turned ON whenever the remote control is effected, and transistor $Q_3$ is used to turn OFF thyristor S. Thus, during the automatic answering operation, heads EH2-1 and RPH2-1 are selected by relay C for the first time, whereas during the remote control operation of the apparatus, heads EH-2 and RPH-2 are selected. During the operations other than the automatic answering operations, that is during direct operation and remote control operation, the operator can select either one of the sets of the heads by operating relay B.

The automatic answering operation will now be described with reference to FIGS. 1 and 2. Under these conditions, an automatic answering button, not shown, in the button circuit 1 is operated. Upon arrival of a call signal at the line terminal 2, the signal is detected by the receiving circuit 3 to apply its output to the controller 4 which applies a control command signal to line control circuit 6. In response to this common signal, the line control circuit 6 establishes in the telephone circuit a flow path of direct current. Concurrently therewith, the controller 4 energizes the tape deck 5 to drive the announcement tape. The controller 4 also controls switching circuit 8 through amplifier 7 to connect the recording and reproducing head RPH1 to the switching circuit 8. The reproduced announcement message signal is amplified by amplifier 7 and is then sent out to the telephone line via controller 4, line control circuit 6 and line terminal 2. When the termination of the announcement message is detected by the controller 4 which supervises the amplifier 7, the controller transmits a new command signal to the tape deck 5 to drive the message tape to prepare for the recording of the message transmitted from the calling party. Until this time, since no remote control operation has been made, the message signal applied to amplifier 7 via line terminal 2, line circuit 6 and controller 4 is supplied to the recording and reproducing head RPH2-1 for the message tape through normally closed contacts (upper contacts) of relays A and B in the head switching circuit 10 via switching circuit 8 whereby the message sent from the calling party is recorded in the first sound track of the message tape. When the controller 4 detects the termination of the message, the device is restored to the original calling signal waiting condition.

The remote control operation is performed in the following manner. When a remote calling party transmits a control signal to the device when it is in the automatic answering condition, the device can initiate its operation in response to the control signal. The identification of the control signal and the control commanded thereby are performed by the remote control circuit 9 which supervises the line terminal 2. For example, when the control signal is identified as a reproduction request signal, the remote control circuit 9 transmits a command signal to the tape deck 5 via controller 4 for driving the message tape whereby the message which has been recorded in the first sound track of the message tape is reproduced by the head RPH2-1. The message thus reproduced is sent to the telephone line via the head switching circuit 10, switching circuit 8, amplifier 7, controller 4, line control circuit 6 and line terminal 2. When the first remote control signal is detected, which may be a reproduction request signal or other signal, an operation corresponding to the detected signal is performed by the remote control circuit 9 while, at the same time, a signal is applied by the remote control circuit 9 to the terminal 18 via controller 4 to turn on thyristor S. Thus, relay C is operated to prepare for the switching of the heads. However, during the remote control operation, as relay A is not energized, the recording and reproducing head RPH2-1 will continue the reproduction of the message tape regardless of the operation of relay C. After completion of the reproduction and listening of the message, the remote calling party transmits a wait signal to the device. Then the device is immediately returned to the calling signal waiting condition.

After such remote control operation, when the device performs a new automatic answering operation in response to a new call signal, relay A operates, which in cooperation with relay C which has been energized from the time of the previous remote control operation function, to switch the recording and reproducing head from head RPH2-1 to RPH2-2 thereby recording the new message in the second sound track of the message tape. Thereafter, when it is desired to reproduce the recorded message by another remote control operation, the calling party transmits a "2 operation signal" in addition to the reproduction request signal. Then, the relay B is energized to reproduce the message recorded in the second sound track.

Upon hearing the reproduced message by the remote control, if the remote calling party determines that the message is not worthwhile to be preserved, the calling party transmits a control signal R. In response to this signal, the remote control circuit 9 operates to send a command signal to terminal 17. Accordingly, the transistor $Q_3$ is turned on to turn off thyristor S to cancel the head switching preparation previously established. Thus, the subsequent new message will also be recorded in the first sound track of the message tape thus preventing decrease of the utilization efficiency of the message tape.

The structure and operation of the components of FIG. 1 not previously described will be described with reference to FIGS. 3(i) and 3(ii).

Button circuit 1

Button circuit 1 has manual operation keys. A function of the automatic telephone answering and recording device according to the present invention is determined in accordance with the operation of the keys. As shown in this embodiment, there are provided six keys, an R key, a 2 key, an announcement-message-recording key, an automatic-answering key, a reproduction or play key, and a restoration key. The 2 key, announcement-message-recording key and automatic-answering key are of a lock type which have a mechanical cooperative relationship with the restoration key so that a lock for each key is released by restoration key operation. The R key, 2 key, announcement-message-recording key, automatic-answering key, reproduction key and restoration key described above are operated to generate outputs which are transmitted from button circuit 1 to controller 4 through the lines 101, 102, 103, 104, 105 and 106.

Receiving circuit 3

A receiving circuit 3 functions to detect a call signal which is transmitted from a telephone line through the line terminals 2 and 2'. The receiving circuit 3 comprises diodes $D_1 - D_4$ arranged in a bridge form which rectify, through a full-wave rectification, a low frequency call signal transmitted from the telephone line, a relay D energized by a DC signal rectified by the diodes $D_1 - D_4$, a make-contact $d$ which is closed at the time the DC signal is supplied by the relay D and a DC-cut condensor $C_1$. ($V_{cc}$ is a power source.)

With this construction, when a call signal is transmitted to the receiving circuit 3 from the telephone line, the relay D is energized and the make-contact $d$ thereof is closed so that the output of the circuit 3 is transmitted to the line 107.

Tape deck 5

Tape deck 5 comprises two endless tapes for recording an announcement and message, the recording and reproducing heads, the erasing head, the motors $M_1$, $M_2$ for driving each tape, a switch So which is closed in contact with an aluminum foil applied to the announcement tape at the time of completion of the one turn of the announcement tape, a relay H for switching the driving of $M_1$, $M_2$ and its contact $h$. The contact $h$ of the relay H is ordinarily constructed so as to drive the motor $M_1$ for driving the announcement message tape.

Line control circuit 6

The line control circuit 6 is a circuit which forms a DC loop by a DC closing signal transmitted from the controller 4. The circuit 6 comprises a transformer $T_1$ with two windings, a relay E (relay coil) driven by the DC closing signal, and a make-contact $e$. One end of a winding is connected to the terminal 2 through the contact $e$ while the other end thereof is directly connected to the terminal 2'.

Further one end of the other winding is grounded, and the other end thereof is connected to the switching circuit 8 through the line 109. One end of the relay E is grounded while the other end thereof is connected to the controller 4 through the line 108.

Remote control circuit 9

The remote control circuit 9 selects a signal transmitted from a remote owner of the device or a person concerned therewith through the telephone line so that the circuit 9 controls the device from a remote place to make it perform the same operation as the key operation of the button circuit 1.

This remote control circuit 9 comprises filters $FL_1 - FL_4$ for selecting a signal capable of performing the operation. The filter $FL_1$ discriminates a wait signal, the filter $FL_2$ discriminates a restoration signal, the filter $FL_3$ discriminates a 2 signal (a signal for selecting the second track of the message tape) and the filter $FL_4$ discriminates an R signal (a signal for switching from the second track of the message tape to the first track thereof.)

These filters have the same circuit construction. Taking a filter $FL_1$ for instance, the filter $FL_1$ comprises a condenser $C_{11}$, a tuning coil $L_{11}$ having a winding with a tap, a diode $D_{11}$, a condenser $C_{12}$, transistors $Q_{11}$ and $Q_{12}$, and the resistors $R_{11}$, $R_{12}$ and $R_{13}$.

The remote control circuit 9 further includes a condenser $C_{14}$, a transformer $T_{12}$, an S-R flip-flop $FF_{11}$ and an OR gate $OG_7$. In the operation of the circuit 9, when the remote control signals are transmitted from the telephone line through the terminals 2, 2', the filters $FL_1 - FL_4$ discriminate the nature of the remote control signals and a DC output is generated at the output of said filters.

The output of the filter $FL_1$ is supplied to a reset terminal R of a flip-flop $FF_{11}$ and to the line 110. The output of the filter $FL_2$ is supplied to the line 111 and OR gate $OG_7$ so that the output of the OR gate is sent to the terminal 18 of the head switching circuit 10. The output of the filter $FL_3$ is supplied to the set terminal of the flip-flop $FF_{11}$ so that the output Q of the flip-flop $FF_{11}$ is supplied to the OR gate $OG_7$ and the terminal 16 of the head switching circuit.

The output of the filter $FL_4$ is directly supplied to the terminal 17 of the head switching circuit 10.

Controller 4

The controller 4 functions to control the operation of the device. The controller 4 comprises S-R type flip-flops $FF_1 - FF_4$, AND gates $AG_1 - AG_6$, OR gates $OG_1 - OG_6$ and a voice switch VS. The flip-flop $FF_1$ sends a command signal for starting or stopping the control operation of the device. The output of flip-flop $FF_1$ is supplied to the tape deck 5 through line 113. The flip-flops $FF_2 - FF_4$ are prepared for resetting in accordance with the $\overline{Q}$ output of the flip-flop $FF_1$. $FF_2$ is utilized for sending a command signal for switching the announcement tape and the message tape. The output Q of the flip-flop $FF_2$ is supplied to relay H of the tape deck 5 through the OR gate $OG_5$ and the line 114 so that the contact h of relay H is switched to drive motor $M_2$ for driving a message tape. Further, $FF_3$ is used for sending a command signal for recording and whose output Q is supplied to AND gate $AG_5$, and further to relay F of switching circuit 8 through the line 116 resulting in the formation of a recording circuit in response to the operation of relay F.

$FF_4$ is used for sending a command signal for remote control whose output Q is respectively supplied to the tape deck 5 and the switching circuit 8 through OR gates $OG_5$, $OG_6$. When the output of OR gate $OG_6$ is transmitted to the switching circuit 8 through the line 115, relay G is driven so that the heads may be switched in accordance with the switching of the announcement tape to the message tape.

In addition to the above, flip-flop $FF_1$ comprises a circuit which is forcibly reset when the power source is turned on. Further, the voice switch VS does not supply an output while the voice signal is transmitted from the amplifier. When the voice signal is gone therefrom, or is interrupted during a predetermined time, the voice switch VS transmits an output.

Switching circuit 8

Switching circuit 8 performs the switching operation of the heads in accordance with the switching of the recording and the reproduction operation of the tape. The switching circuit 8 comprises relay F and G, the contacts $f_1 - f_4$, $g_1 - g_2$ of relays F, G and the resistors $R_{21} - R_{24}$.

Now, the function and operation of each means described above will be described.

1. Operation for manually recording the announcement

During this operation, MIC is inserted in a microphone jack and the announcement message recording key is pushed by manual operation. Therefore, a signal generated due to the key operation is transmitted from the button circuit 1 to the set terminal S of the flip-flop $FF_1$ through the line 103 and the OR gate $OG_2$ of the controller, and simultaneously to the set terminal S of the flip-flop $FF_3$ through OR gate $OG_1$. Thus, these flip-flops $FF_1$, $FF_3$ are set by means of this signal. The output Q of $FF_1$ is supplied to the tape deck 5 through the line 113 thereby driving the motor $M_1$.

In consequence, the announcement tape is started. Then, since the flip-flop $FF_4$ is reset, it transmits the output $\overline{Q}$. Accordingly, AND gate $AG_5$ is enabled so that the output of the gate $AG_5$ is sent to relay F through the line 116 resulting in the driving of the relay F. The contact f of relay F is switched. In this manner, while the driving condition of the announcement message tape is satisfied, the following passage is formed to record the desired announcement on the announcement tape.

1  MIC — microphone jack — contact $f_2$ — line 118 — amplifier 7 — line 119 — resistor $R_{23}$ — contact $f_3$ — contact $g_1$ — RPH — 1

2  Vcc — resistor $R_{24}$ — contact $f_4$ — contact $g_2$ — $EH_1$

The recording operation is completed to operate the restoration key of the push button circuit 1. The announcement-message-recording key which was locked is then restored by operating the restoration key. In accordance with the operation of the restoration key, the output supplied to the line 106 is supplied to the reset terminal R of $FF_1$ through OR gate $OG_3$ resulting in the resetting of $FF_1$.

In consequence, $FF_3$ is also reset by the output $\overline{Q}$ of $FF_1$.

2. Automatic answering operation

Under these conditions, the automatic-answering key is pushed to be locked by the manual operation. To this end, a signal is respectively supplied to one of the inputs of AND gates $AG_1$, $AG_4$ and $AG_6$ from the line 104. Further, the output $\overline{Q}$ from $FF_4$ is supplied to the other inputs of $AG_6$ so that AND gate $AG_6$ is enabled to operate relay A of the head switching circuit 10 through the terminal 17 in such a manner that it is possible to operate the heads EH2-1, RPH2-1. Under this condition, the signal (call) supplied to the terminals 2 and 2' via the telephone line is attended.

A. General calling operation

Upon arrival of a call signal, the signal is rectified by the diodes $D_1 - D_4$ (diode bridge) of the receiving circuit 3. In response to the output of the diode bridge, relay D is energized so that the contact d of relay D is closed and the voltage Vcc is applied to AND gate $AG_1$ of the controller 4 via line 107. AND gate $AG_1$ is enabled and the output thereof is supplied to the flip-flop $FF_1$ via OR gate $OG_2$ thus setting the flip-flop $FF_1$. In response to the output Q of $FF_1$, AND gate $AG_4$ is enabled so that the output of $AG_4$ is supplied to relay E of the line control circuit 6 thereby energizing the relay E through the line 108. Consequently, the contact e of relay E is closed to form the DC loop on the telephone line, whereby, after the completion of predetermined operation at the exchange office side (not shown), the voice of the calling party is transmitted. The output Q of flip-flop $FF_1$ is supplied to the tape deck 5 as well as to the AND gate $AG_4$ thus driving the announcement message tape.

The signal read out from the tape is transmitted to the telephone line through the following passage.

head $RPH_1$ - contact $g_1$ - contact $f_3$ - contact $f_2$ - amplifier 7 - line 119 - contact $f_1$ - transformer $T_1$ -

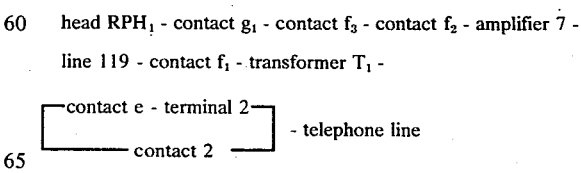

After completion of one turn of the announcement tape, the contact $S_o$ of the tape deck 5 is closed and a signal generated due to the closed operation is supplied to $FF_2$, $FF_3$, line 112, $OG_4$ and $OG_5$ resulting in the setting of $FF_2$ and $FF_3$.

First, when $FF_2$ is set, the output Q of $FF_2$ is supplied to relay H of tape deck 5 via OR gate $OG_5$ and line 114. The contact $h$ of relay H is switched and the motor $M_2$ is driven. Then the motor stops in accordance with the switching operation of the contact $h$. The motor $M_2$ is driven to start the announcement tape. Further, the output Q of $FF_2$ is supplied to relay G of the switching circuit 8 through OR gate $OG_6$ thus driving the relay G. In consequence, the contacts $g_1$ and $g_2$ are switched. The operation of the relay G makes it possible to switch the heads to record the message tape.

Second, when $FF_3$ is set, the output Q is supplied to AND gate $AG_5$. In this case, the output $\bar{Q}$ is supplied from $FF_4$ to AND gate $AG_5$, and AND gate $AG_5$ is enabled to drive relay F of the switching circuit 8 through line 116 whereby the connecting condition between the amplifier 7 and the recording head is switched to form the recording circuit. Under this condition, the voice signal or message of the calling party is sent from the telephone line to the terminals 2 and 2'. The signal is transmitted to the switching circuit 8 via the line control circuit 6 and to the amplifier 7 via a passage such as contact $f_1$ — resistor $R_{21}$ — microphone jack — contact $f_2$ — line 118, and further to terminal 12 of the head switching circuit 10 via a passage such as line 119 — resistor $R_{23}$ — contact $f_3$ — contact $g$. The erasing current supplied to the erasing head is supplied to the terminal 11 of the head switching circuit 10 via Vcc, resistor $R_{24}$, contact $f_4$ and contact $g_2$.

The voice signal sent to the terminal 12 of the head switching circuit 10 is transmitted to the head $RDH_2^{-}{}_1$ via the contact $a_2$ and the contact $c_2$. In accordance with the operation of the head $RDH_2^{-}{}_1$, the voice signal is recorded on the first sound track of the announcement tape.

The erasing current supplied to the terminal 11 of the head switching circuit 10 is transmitted to the head $EH_2^{-}{}_1$ via the contacts $a_1$ and $c_1$.

While the voice of the calling party is being transmitted to the device, the output of the amplifier 7 is supplied to the voice switch VS of the controller 4 via the line 117. Therefore, the output of VS is zero (0). When the voice of the calling party ceases to be sent, the output of the voice switch VS becomes 1, which is supplied to the AND gate $AG_3$.

Now, considering the other inputs of AND gate $AG_3$ in the above condition, the output Q 1 from $FF_2$ and the output $\bar{Q}$ 1 from $FF_4$ are respectively supplied to the inputs of the AND gate $AG_3$. Therefore, when the message from the calling party stops or disappears, the output of the voice switch Vs reaches 1, AND gate $AG_3$ is enabled, and the output thereof is supplied to the reset terminal R of the flip-flop $FF_1$ via OR gate $OG_3$ thereby resetting $FF_1$. Immediately, the flip-flop $FF_1$ is reset and each flip-flop $FF_2 - FF_4$ is reset in response to the output $\bar{Q}$ of $FF_1$. In this case, the automatic-answering key of the push button circuit 1 remains to be pushed so that the output thereof continues to be supplied to the line 104 which prepares for the next call. In this manner, upon the arrival of the next call, the same operation is repeated.

B. Remote control operation by an owner of the device or a person connected therewith As set forth in the section entitled General Calling Operation, (Item A), when the automatic-answering key of the button circuit 1 is pushed, the device is remote-controlled. In this case, the owner, after calling the device by dial operation such as by a general call, operates the special oscillator to transmit a signal to the device. The structure and handling of the special oscillator is shown, for instance, in U.S. Pat. No. 3,337,690. The special oscillator is capable of transmitting different low frequency signals, which are identified as command signal such as "wait", "reproduction", "2", and "R".

1. The operation of the reproduction command or request signal

When a signal identified as the reproduction request signal is transmitted from the special oscillator via the telephone line, the signal is sent to the remote control circuit 9 via the terminals 2 and 2'. It is noted that, before sending the signal to the device, the receiving circuit 3 receives the call signal, the same as in the case of a usual call, to perform the general calling operation (Item A) so that the device is operated to prepare to receive the message. The remote control circuit 9 receives the signal and transmits the signal to the filters $FL_1 - FC_4$ via the transformer $T_{12}$. In this case, since the signal from the circuit 9 is a signal having a frequency corresponding to that of the reproduced request signal, an output is transmitted from the filter $FL_2$. The output from the filter $FL_2$ is supplied to the flip-flop $FF_4$ of the controller 4 thus setting $FF_4$. Accordingly, $FF_4$ transmits the output Q, which is respectively supplied to the tape deck 5 and the switching circuit 8 via OR gates $OG_5$ and $OG_6$. The output of $OR_5$ supplied to the tape deck 5 drives relay H to switch the contact $h$ so as to drive the motor $M_2$.

Consequently, the message tape begins movement. The signal transmitted to the switching circuit 8 drives relay G to switch the contacts $g_1$, $g_2$ so as to be able to use the head at the side of the message tape.

The output $\bar{Q}$ of $FF_4$ is, during the setting of $FF_4$, not supplied to AND gate $AG_6$ so that $AG_6$ is disabled. Relay A of the head switching circuit 10 is also restored. Also, since the output $\bar{Q}$ of $FF_4$ is not supplied to AND gate $AG_3$, the AND gate $AG_3$ remains disabled without affecting the output of voice switch VS. This does not lead to the operation of the voice switch VS.

Further, since the output $\bar{Q}$ of $FF_4$ is not supplied to AND gate $AG_5$, the AND gate $AG_5$ is disabled to release the relay F. Thus, a reproduced operation circuit is formed in the switching circuit 10. In the switching circuit, then, relays A, B are not operated so that a signal recorded in the first sound track of the message tape is transmitted to the telephone line through a passage such as $RPH_2^{-}{}_1$ — contact $b_2$ — contact $a_2$ — terminal 12 — contact $g_1$ — contact $f_3$ — contact $f_2$ — line 118 — amplifier 7 — line 119 — contact $f_1$ — line 109 — line control circuit 6 — terminals 2, 2' — the telephone line.

In this condition, the output of the filter $FL_2$ is supplied, via the OR gate $OG_7$, to the head switching circuit 10. The switching circuit 10 receives the signal at the terminal 18, keeping the thyristor S (shown in FIG. 2) in a conductive condition, and driving relay C to switch the contacts $c_1$ and $c_2$ to prepare for switching the next head.

2. The operation to be performed when the message is not worth preserving upon hearing the reproduced message by the remote control operation Upon hearing the content of the message tape by the remote control operation, if the owner of the device judges that the message is not worth preserving, a control signal R is transmitted from the special oscillator. In response to this signal, the filter $FL_4$ of the remote control circuit 9 discriminates the signal so that the DC output from the remote control circuit 9 is supplied to the terminal 17 of the head switching circuit 10. Accordingly, the transistor $Q_3$ of the head switching circuit 10 is turned on to short-circuit both ends of thyristor S thereby resetting the thyristor. Thus, relay C is deenergized and the contacts $c_1$ and $c_2$ are returned to the condition to FIG. 2 to cancel the head switching preparation previously established.

Accordingly, it will be understood that the above condition is the same as the condition wherein the automatic answering key of the button circuit 1 described in the automatic answering operation (Item (2)) is pushed. Therefore, the subsequent new message also will be recorded in the first sound track of the message tape.

3. The operation to be performed when the message is worth preserving upon hearing the message recorded by the remote control operation Upon hearing the content of the message by the remote control, if the owner of the device judges that it is worth preserving, he transmits a wait signal to the device by operating the special oscillator. The signal is discriminated by the filter $FL_1$ of the remote control circuit 9 and the output thereof is supplied to the reset terminal R of $FF_1$ through the line 110 and OR gate $OG_3$ of the controller thus resetting the flip-flop $FF_1$. Accordingly, $FF_2 - FF_4$ are simultaneously reset by the output $\overline{Q}$ of $FF_1$ so that the reproduced operation of the remote control is completed. Then relay C of the head switching circuit 10, as described above, continues to be energized.

4. The operation to be performed when the new call is transmitted to the device after completion of reproduction by the remote control operation Under the above condition of item (3), when the new call is transmitted to the device, the device performs the same operation as that of general calling as described in item (A). However, since relays A, C are operated to switch the contacts thereof, a message due to the new call is transmitted to the head $RPH_{2-2}$ through the terminal 12 and the contacts $a_2$, $c_2$ of the switching circuit 10.

Thus, the message is recorded in the second sound track of the message tape.

It will be understood from the above explanation that the message recorded in the first sound track of the message is preserved without being erased.

5. The operation to be performed when the reproduction of the second sound track of the message tape is realized by the remote control operation Assume the owner operates the special oscillator to simultaneously transmit the reproduction signal and the 2 signal. When the reproduction signal and the 2 signal are transmitted to the device, through the telephone line, these signals are discriminated by the filters $FL_2$, $FL_3$ of the remote control circuit. The output of the filter $FL_3$ is supplied to the set terminal S of the flip-flop $FF_{11}$, thus setting $FF_{11}$. The output of $FF_{11}$ is respectively supplied to the terminal 18 of the head switching circuit 10 through OR gate $OG_7$, and directly to the terminal 15.

Further, the output of the filter $FL_2$ is supplied to OR gate $OG_7$ as well as to the output of the flip-flop $FF_{11}$ described above, and simultaneously to the set terminal S of the flip-flop $FF_4$ of the controller 4 resulting in the setting of the flip-flop $FF_4$. Accordingly, the output $\overline{Q}$ of $FF_4$ which is supplied till then, ceases to be supplied to the AND gate $AG_6$, which is disabled. Relay A, which was operated by the output of $AG_6$, is restored and the contacts thereof $a_1$ and $a_2$ return to the condition of FIG. 2. Then, in the head switching circuit 10, relay A is not operated while relays B and C are operated, so that the message of the second sound track is transmitted from the terminal 12 to the switching circuit 8 through $RPH_{2-2}$ and the contacts $b_2$ and $a_2$. Thereafter, the transmission passage of the reproduced message is the same as the passage of that of item B-1.

6. The operation to be performed after the second track of the message tape is reproduced by the remote control operation In this case, the owner of the device transmits a R signal so that the filter $FL_4$ of the remote control circuit 9 discriminates the signal to supply a DC output to the terminal 17 of the head switching circuit 10. Accordingly, the transistor $Q_3$ of the head switching circuit 10 turns on and both ends of the thyristor are short-circuited so that the thyristor is reset. In response to the above operation of the thyristor S, relay C is deenergized and its contacts $c_1$, $c_2$ return to the condition of FIG. 2 so that the circuit for recording the message in the first track of the message tape is established. The above condition is the same as the condition wherein the automatic-answering key of the button circuit 1 is pushed, which was described in the first paragraph of item 2.

3. The operation to be performed when the message is manually reproduced after the automatic answering operation In this case, the reproduction key of the button circuit 1 is manually pushed to transmit a signal from the button circuit 1 on the line 105. Thus, the signal is supplied to the OR gates $OG_2$, $OG_4$. In response to the output of OR gate $OG_2$, the flip-flop $FF_1$ is set, and the flip-flop $FF_3$ is set in response to the OR gate $OG_4$. The motor $M_2$ of the tape deck 5 is driven by the outputs Q of $FF_1$ and $FF_3$. Further, in response to the output Q of the flip-flop $FF_3$, relay G of the switching circuit 8 is energized and a reproduction circuit from the head for reproducing the message of the message tape is established. Then, since AND gate $AG_6$ of controller 4 is disabled, relay A is not operated nor are other relays B, C. Accordingly, the message recorded in the first sound track of the message tape, after being reproduced by the head $RPH_{2-1}$, is transmitted therefrom to the speaker through a passage such as $RPH_{2-1}$ — contact $b_2$ — contact $a_2$ — terminal 12 of the head switching circuit 10 — contact $g_1$ — contact $f_3$ — contact $f_2$ — line 118 — amplifier 7. Then the message is broadcast from the speaker.

4. The operation to be performed when the message is not worth preserving upon hearing the message manually recorded after the automatic answering operation In this case, when the restoration key of the button circuit 1 is pushed, a signal transmitted from the button circuit 1 to the line 106 is transmitted to the reset terminal R of $FF_1$ through $OG_3$ thus restoring the operation of the device. Accordingly, when the automatic answering operation is next performed, the message is automatically recorded in the first sound track of the massage tape while the message previously recorded is automatically erased by the erasing head $EH_{2-1}$. In addition to the above, there is a case wherein the second sound track of the message tape is selected by the remote control operation during the automatic answering operation. Thus, since relay C is operated, it is desirable to push not only the restoration key but also the R key.

5. The operation to be performed when the message recorded in the second sound track of the message tape is manually reproduced after recording the message in the second track of the message tape by remote control operation and performing the automatic answering operation In this case, both the lock-type 2 key and the reproduction key of the button circuit 1 are simultaneously pushed. The output transmitted from the button circuit 1 on the line 102 due to the operation of the 2 key is supplied to the transistor $Q_2$ via the controller 4 and the terminal 14 of the head switching circuit 10 thereby operating the relay B. Accordingly, in the circuit 10, the message is reproduced through $RPH_{2-2}$, contact $b_2$, contact $a_2$ and terminal 12, so that the restoration key is pushed to complete the reproduced operation.

6. The operation to be performed when the second sound track of the message tape is manually switched to record in the first sound track after the completion of the reproduced operation described in item 5.

In this operation, when the R key of the button circuit 1 is manually pushed, a signal transmitted from the button circuit 1 thereby is supplied to the controller 41 through line 101, and to the terminal 16 of the head switching circuit 10 so that the transistor $Q_3$ assumes a conductive condition and the thyristor S is short-circuited to restore the relay C. Accordingly, when the subsequent automatic answering operation is performed, the message is recorded in the first sound track of the message.

Although in this embodiment, whenever a remote control signal is received, the track of the message tape is switched except for the case wherein a specific track is selected by the control signal R, it is advantageous to construct the apparatus such that the tracks are switched only when the drive of the message tape is remotely controlled. This is because it is not necessary to switch the sound tracks of the message tape for such a case wherein a remote control independent of the message tape, for example, a renewal of the announcement message, is performed.

Furthermore, it is advantageous to provide suitable means for rewinding the message tape and to operate it when the remote control operation is completed. Such a measure is useful to efficiently use the new track from the starting end of the message tape.

In this embodiment, since a message tape having two sound tracks is used, at the time of the second remote control, unless a specific track is designated by sending a 2-operation-signal, the same track as that reproduced in the first remote control operation would be reproduced. To obviate this difficulty, it is advantageous to construct the device so that is includes a mechanism that automatically selects the second sound track when the reproduction of the first track by the first remote control operation is completed.

It is also possible to provide three or more tracks for the message track and to provide suitable mechanical means to shift one set of recording and reproducing heads from one track to the other.

In the embodiment described above, even when no message is recorded, the tracks are always switched when the remote control operation is once performed. Accordingly, it is advisable to construct the device so that the tracks are switched only when the message has been actually recorded.

Moreover, instead of switching the sound tracks only when it is desired to record the message subsequent to the first remote control operation, it is also possible to modify the device so that the tracks are switching not only when the device is used to act as the answering and recording device but also when the device is used as a telephone memorandum for recording ordinary telephone conversations.

Figure 3:
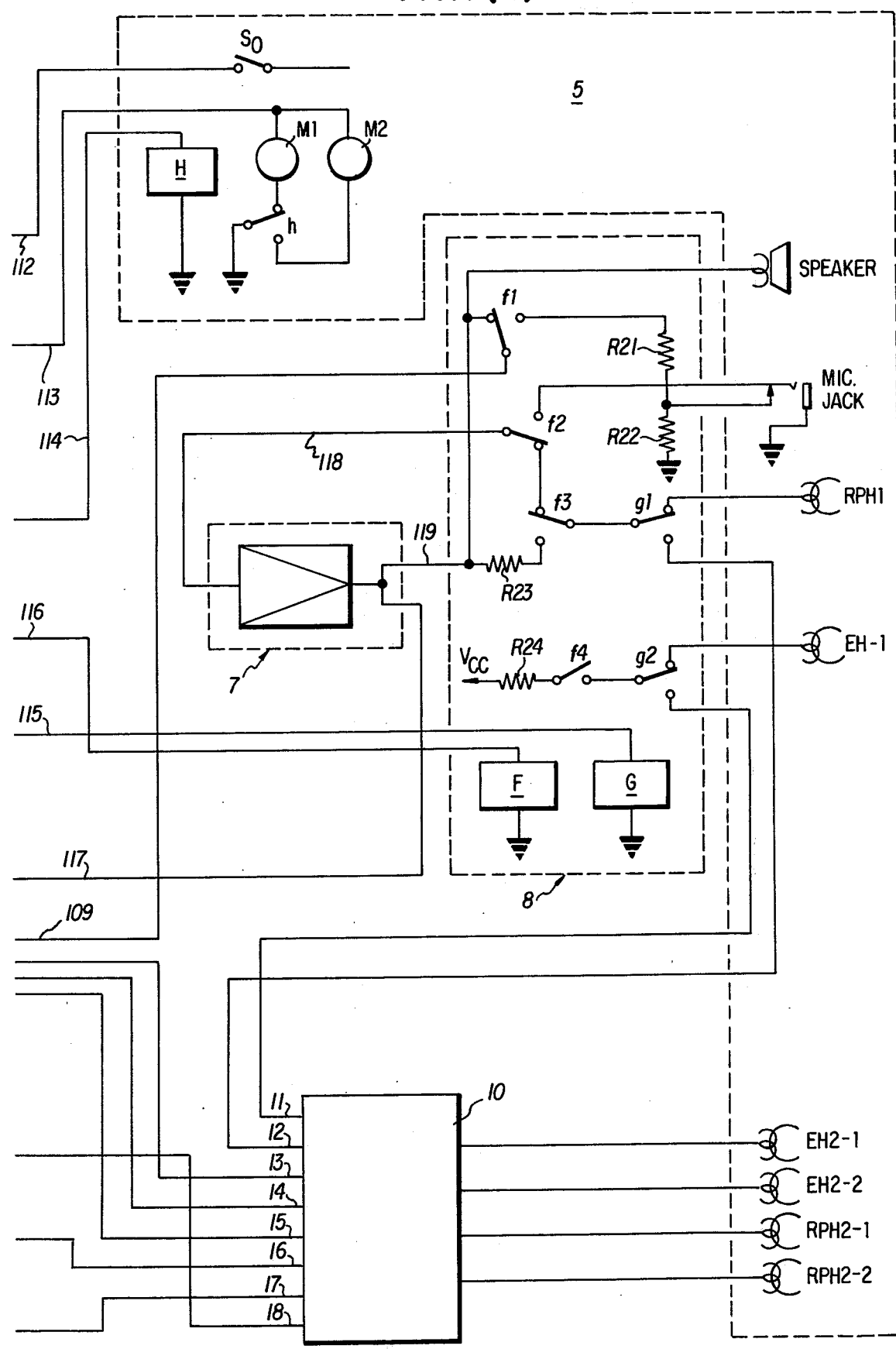

Although in the embodiment of FIG. 3, the owner uses the special oscillator for the purpose of operating the remote control circuit 9, whenever the telephone set is a key telephone, it is also possible to produce the request signal which controls the remote control circuit by selecting either of the keys or combining a few keys.

Further, although the voice switch circuit VS utilized in FIG. 3 is a delay circuit which comprises a C.R or LC.R and a transistor, it is also possible to use a timer which operates in a predetermined time in accordance with the first voice signal.

In general, the input gain of amplifier 7 varies depending on either recording operation or reproducing operation. The amplifier circuit may be constructed in such a manner that the amplifier gain is controlled by the output from AND gate 5 included in controller 4 or by the relay F of switching circuit 8. As shown in FIG. 1, a connection is established through which controller 4 controls the amplifier gain. Specifically, such connection may be realized by applying an AGC (automatic gain control) to the amplifier during the recording operation and by stopping the AGC during the reproducing operation. Also, in order to control the amplifier gain only when reproduction is performed during remote control operation, it is advisable that the AGC for the amplifier 7 be disconnected by the output of filter $FL_2$ included in remote control circuit 9.

From the foregoing description, it will be noted that the invention provides a new and improved automatic telephone answering and recording device wherein the tracks of a message tape are switched whenever a remote control operation is performed so that it is possible to preserve the recorded messages and to increase the efficiency of operation of the device.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by letters patent of the United States is:

1. An automatic telephone answering and recording device adapted to be associated with a telephone set which is connected to a telephone line comprising:
    a sound recording tape provided with a plurality of sound tracks, a plurality of sound recording and reproducing heads corresponding to the plurality of sound tracks of the sound recording tape, a receiving means for receiving a call signal transmitted from a remote calling party, head switching means for selecting one of the sound recording and reproducing heads associated with one of the sound tracks of the sound recording tape, control means responsive to an output of the receiving means for controlling the head switching means to record a message transmitted from the remote calling party on a first sound track of the sound recording tape through the head switching means and through a first sound recording and reproducing head selected by the head switching means, remote control means responsive to a request signal transmitted from another remote calling party for causing the control means to reproduce the message recorded in the first sound track of the sound recording tape by the first sound recording and reproducing head, and line control means for transmitting the message from the first sound track of the sound recording tape to the another remote calling party, the remote control means responding to a next request signal from the another remote calling party for causing the head switching means to select the second sound recording and reproducing head associated with the second sound track of the sound recording tape to record a subsequent message on the second sound track.

2. The automatic telephone answering and recording device according to claim 1 wherein the control means comprises means for responding to a recording termination of the message in the first sound track of the sound recording tape to cause the device to be restored to a calling signal waiting condition.

3. The automatic telephone answering and recording device according to claim 1 wherein the another remote calling party transmits a special control signal when it is determined that the message reproduced from the first sound track of the sound recording tape is not worth preserving, and the remote control means responds to the special control signal for controlling the head switching means to reselect the first sound recording and reproducing head associated with the first sound track to record subsequent messages in the first sound track.

4. The automatic telephone answering and recording device according to claim 1 which further comprises switcing means controlled by the control means for selecting a microphone, a recording and reproducing head associated with an announcement tape, and an amplifier, the microphone being operatively connected to the recording and reproducing head associated with the announcement tape through the switching means and the amplifier when an announcement message is recorded on the announcement tape.

5. The automatic telephone answering and recording device according to claim 1 wherein the line control means applied a DC closing signal to the telephone line when the receiving means receives a control signal from the remote calling party.

6. The automatic telephone answering and recording device according to claim 5 which further comprises switching means controlled by the control means for selecting a recording and reproducing head associated with an announcement tape, and wherein the receiving means responds to a call signal sent from a remote calling party to control the control means so that the announcement message reproduced from the announcement tape by the recording and reproducing head associated with the announcement tape is transmitted to the remote calling party through the line control means.

7. The automatic telephone answering and recording device according to claim 6 wherein the control means detects the termination of the reproduced announcement message and controls the switching means to allow the switching means to record a message from the remote calling party on one of the sound tracks of the sound recording tape.

8. The automatic telephone answering and recording device according to claim 1 wherein the head switching means comprises first, second and third transistors, first, second and third relays respectively energized by the first, second and third transistors, and a thyristor connected in parallel with the third transistor, each of the first and second relays comprising a transfer contact establishing a first path for causing the first sound recording and reproducing head associated with the first sound track of the sound recording tape to receive and transmit a message when the first and second relays are not energized, the third relay comprising a transfer contact which is preselected to establish a second path from the first sound recording and reproducing head to a second sound recording and reproducing head associated with a second sound track of the sound recording tape when a reproduction command is received from the remote control means to turn on the thyristor and to subsequently establish a third path for causing the second sound recording and reproducing head associated with the second sound track of the sound recording tape to receive and transmit the message when a next call signal is transmitted, the preselection being cancelled when the another remote calling party determines that the message reproduced from the first sound track of the sound recording tape is not worth preserving and turns on the third transistor by the remote control means, the first transistor being turned on until a reproduction command is received from the remote control means during an automatic answering operation, the second transistor being turned off during an automatic answering operation.

9. The automatic telephone answering and recording device according to claim 8 which further comprises switching means controlled by the control means for selecting a loudspeaker, and an amplifier, the loudspeaker being operatively connected to one of the recording and reproducing heads associated with one of the sound tracks of the sound recording tape to be reproduced through an amplifier during manual operation under control of a manual reproduction command.

10. The automatic telephone answering and recording device according to claim 9 wherein the second transistor is turned on for establishing the second path for causing the second sound recording and reproducing head associated with the second sound track of the sound recording tape to receive and transmit the message when a manual reproduction command is received for reproducing a message recorded on the second sound track of the sound recording tape.

* * * * *